United States Patent

Cricchi

[15] 3,702,465

[45] Nov. 7, 1972

[54] ELECTRO-OPTIC MASS MEMORY

[72] Inventor: James R. Cricchi, Catonville, Md.

[73] Assignee: Westinghouse Electric Corporation, Pittsburgh, Pa.

[22] Filed: Aug. 4, 1971

[21] Appl. No.: 168,913

[52] U.S. Cl. ......340/173 LT, 250/211 J, 317/235 N, 340/173 LS, 340/173 LM, 340/174.1 M

[51] Int. Cl. ..........................G11c 13/04, G11c 11/34

[58] Field of Search....340/173 LT, 173 LS, 173 LM, 340/174.1 M; 317/235 N; 250/211 J

[56] References Cited

UNITED STATES PATENTS

| | | | |
|---|---|---|---|
| 3,528,064 | 9/1970 | Everhart | 340/173 LT |
| 3,648,258 | 3/1972 | Sewell | 340/173 LS |
| 3,649,838 | 3/1972 | Phelan | 317/235 N |
| 3,651,488 | 3/1972 | Amodei | 340/173 LS |

*Primary Examiner*—James W. Moffitt
*Assistant Examiner*—Stuart Hecker
*Attorney*—F. H. Henson et al.

[57] ABSTRACT

A metal-nitride-oxide semiconductor memory device wherein information is written into the device by the combination of an applied electric field and a source of light, and thereafter read out by reflecting light from the surface of an area of the device whose oxide-nitride interface has been previously charged with information written into the device.

10 Claims, 7 Drawing Figures

ELECTRO-OPTIC MASS MEMORY

BACKGROUND OF THE INVENTION

As is known, memory elements have been developed that utilize the hysteresis effects observed in connection with certain insulators in MIS field effect transistors. In the more conventional approaches to the application of transistors to provide information storage, the transistors, which exhibit no hysteresis, are combined into a circuit that does exhibit hysteresis. Memory function is then a property of the circuit. This requires many elements to achieve a single bit storage.

The usual form of transistor memory element is a standard insulated-gate field effect transistor structure in which the silicon dioxide gate insulator is replaced by a double insulator, typically a layer of silicon dioxide nearest the silicon substrate and a layer of silicon nitride over the silicon dioxide. This structure is commonly called a metal-nitride-oxide semiconductor memory transistor. The hysteresis is associated with the existence of traps (electronic states) at or near the silicon dioxide-silicon nitride interface; and the threshold voltage of the insulated-gate field effect transistor is influenced by the charged state of the traps.

There are several possible modes of operation by which the traps can be charged and discharged. The more conventional of these includes direct tunneling between the traps and the silicon; Fowler-NOrdeim tunneling through the silicon dioxide barrier; bulk conduction in the silicon nitride, which can be in the form of several different mechanisms; and direct carrier injection over the Schottky barrier between the silicon and the silicon dioxide.

In all of these cases, traps exist at or near the interface between the silicon dioxide and silicon nitride layers. These traps are conventionally charged and discharged by the application of a sufficiently large voltage of suitable polarity to the gate electrode; while information normally is read out of the device via the source and drain electrodes of the field effect transistor.

SUMMARY OF THE INVENTION

In accordance with the present invention, a semiconductor memory device is provided in which write-in and read-out of information (i.e., bits) is by way of optical techniques.

Specifically, there is provided a semiconductor substrate, such as silicon, having a layer of silicon dioxide formed on a surface thereof, together with an overlying layer of silicon nitride. Deposited on top of the silicon nitride layer is an electrode, preferably a transparent electrode such as a layer of tin oxide or indium oxide, deposited by cathode sputtering techniques.

When the electrode is pulsed with a positive potential independent of the light level, a net negative stored charge comprised of electrons and holes will be produced in the interface between the silicon dioxide-silicon nitride layers. This represents a cleared or zero memory state. If a negative pulse is applied, a deep potential well is induced at the surface of the underlaying silicon wafer and little change in the memory state occurs. However, upon exposure to light, preferably polarized light, and the application of a negative pulsed potential to the transparent electrode, the charge induced in the potential well is dissipated and a net positive charge is transferred to the nitride-oxide interface where it is stored. The charge stored at the nitride-oxide interface will modulate the surface potential and the amplitude and phase of reflected polarized light. Hence, the amplitude and phase of light subsequently reflected from the surface of the silicon nitride layer is a measure of the charge stored at the nitride-oxide interface and indicates whether a "bit" of information is stored in the device. In order to erase information, it is necessary only to again pulse the transparent electrode with a positive pulse; whereupon a net negative stored charge at the nitride-oxide interface comprised of electrons and holes is produced.

In the preferred embodiment of the invention, an array of potential wells on essentially 1 mil centers is provided on a single N-type silicon substrate, the wells being isolated one from the other by N+ diffusions surrounding each potential well. This array is then scanned with a beam of polarized light to either read-in or read-out information, the scanning cycle being synchronized with the application of suitable potentials to the transparent electrode to either perform a write-in or read-out function. It should be noted that P-type silicon and P+ diffusions with opposite polarity applied bias may also be used. Further, it is also possible to illuminate the entire array with an image such as a hologram and store a pattern of charge accordingly.

It is also possible in accordance with the invention to direct the beam of light against the side of the semiconductor wafer opposite the silicon dioxide and silicon nitride layers, in which case the electrode to which pulsing potentials are applied need not be transparent. In this latter case, it is necessary for the supporting substrate material such as sapphire or spinel to be transparent. Also, the semiconductor must be sufficiently thin such that the hole-electron pairs produced in the semiconductor may be able to reach the deep depletion region, recombine and thus collapse the depleted region.

DESCRIPTION OF THE PREFERRED EMBODIMENTS

The above and other objects and features of the invention will become apparent from the following detailed description taken in connection with the accompanying drawings which form a part of this specification, and in which.

Figure 6:
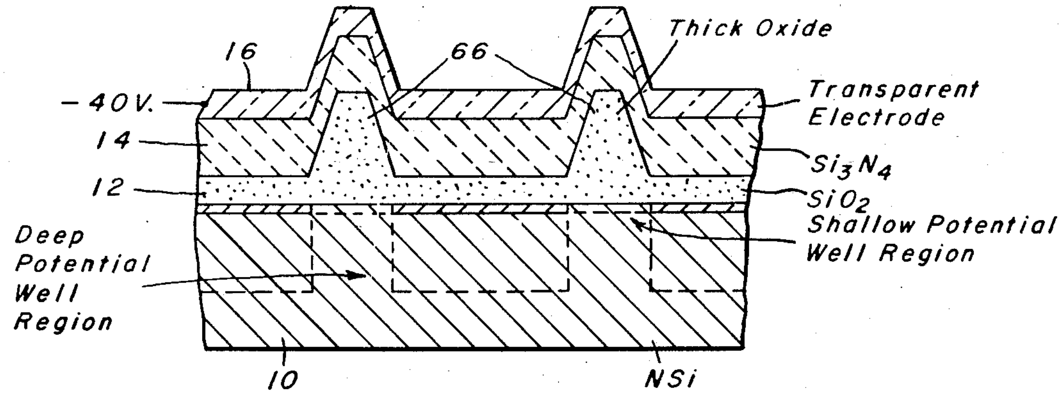
Figure 7:
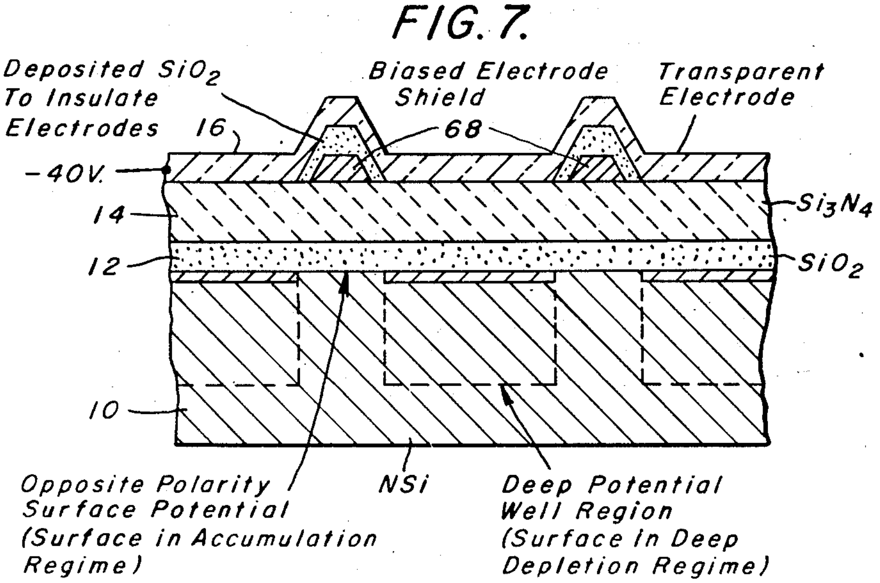

FIG. 6 is a cross-sectional view illustrating another embodiment of the invention wherein deep potential well regions are isolated one from the other by means of thick oxide regions deposited above a semiconductor wafer; and FIG. 7 is a cross-sectional view of still another embodiment of the invention wherein adjacent deep potential well regions are isolated one from the other by a grid of overlying polycrystalline silicon or aluminum.

Figure 1:
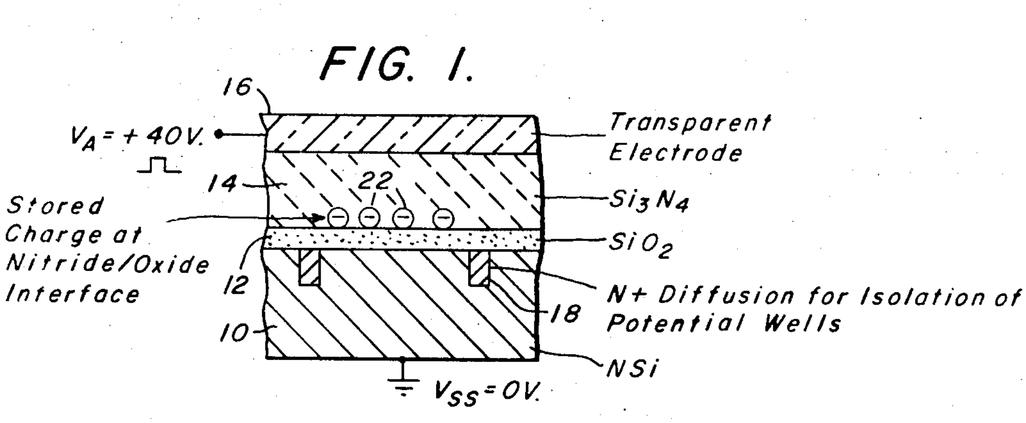
FIG. 1 is a cross-sectional view of a metal-nitride-oxide semiconductor memory device fabricated in accordance with the teachings of the invention and showing the stored charge which exists at the nitride-oxide interface upon application of a positive potential between a transparent electrode above the silicon nitride layer and an underlying silicon substrate.

With reference now to the drawings, and particularly to FIG. 1, the structure shown includes a substrate 10 comprising a wafer of N-type silicon. On top of the wafer 10 is a layer 12 of silicon dioxide typically having a thickness of about 20 Angstrom units. On top of the silicon dioxide layer 12 is a layer 14 of silicon nitride, typically having a thickness in range of about 500 to 750 Angstrom units. As will be appreciated, the drawing is not to scale.

Deposited on top of the silicon nitride layer 14 is a layer 16 of transparent electrically conductive material such as tin oxide or indium oxide which may be deposited on the layer 14, for example, by means of cathode sputtering techniques or the like. Diffused into the upper surface of the wafer 10, before application of the silicon dioxide layer 12, is an N+ diffusion 18 which completely surrounds an area 20 beneath the silicon dioxide layer 12. The purpose of the diffusion 18 is to provide a boundary around the layer 20 in order that a plurality of areas may be used on the same silicon substrate, in a manner hereinafter described, to provide for storage of a plurality of "bits" on a single silicon wafer.

As shown in FIG. 1, and assuming that a positive potential, $V_A$, of about 40 volts is applied to the transparent electrode 16, a net negative stored charge comprising electrons and holes 22 will form at the nitride-oxide interface. This represents the cleared or zero memory state. Now, if a negative pulsed potential is applied to the electrode 16 in the absence of light, a deep potential well 20 will be induced at the upper surface of the wafer 10, which well is bounded by the N+ diffusion 18. Little change in the charge stored in the nitride-oxide interface occurs for this dark condition.

Figure 2:
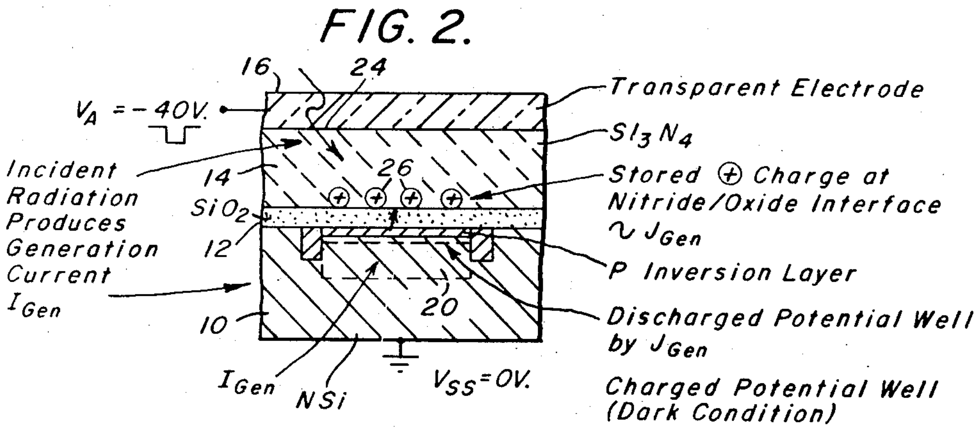
FIG. 2 is an illustration similar to that of FIG. 1 but illustrating the stored charge conditions which exist at the nitride-oxide interface upon the application of a pulsed negative potential both before illumination (dark condition) and after light is directed on the surface.

If the structure shown in FIG. 2, under the conditions shown, is scanned with a beam of light (or illuminated with an image) while a negative potential is applied to the electrode 16, the charge induced in the potential well within the borders defined by diffusion 18 will dissipate and a net positive charge is transferred to the nitride-oxide interface where it is stored. Under these conditions, the incident radiation will produce a generation current, $I_{GEN}$, which discharges the charged potential well 20, causing a stored charge 26 of holes to be generated at the nitride-oxide interface. This stored charge will persist for a long period of time. Now, if the surface of the transparent electrode 16 is illuminated with a beam of light, preferably polarized light, the amplitude and phase of the reflected polarized light will be affected by the stored charge at the nitride-oxide interface in the different locations of the matrix. Specifically, the amplitude and phase of reflected polarized light will differ materially, depending upon whether the stored charge at the nitride-oxide interface is negative as shown in FIG. 1 or positive as shown in FIG. 2. Therefore, by directing polarized light onto the surface of the transparent electrode 16 and by observing the amplitude and phase of the reflected polarized light, it is known whether a charge (i.e., "bit" representing a one or zero state) has been stored in the device. It is also possible to detect different magnitudes to develop shades of gray as for an analog read-out.

Figure 3:
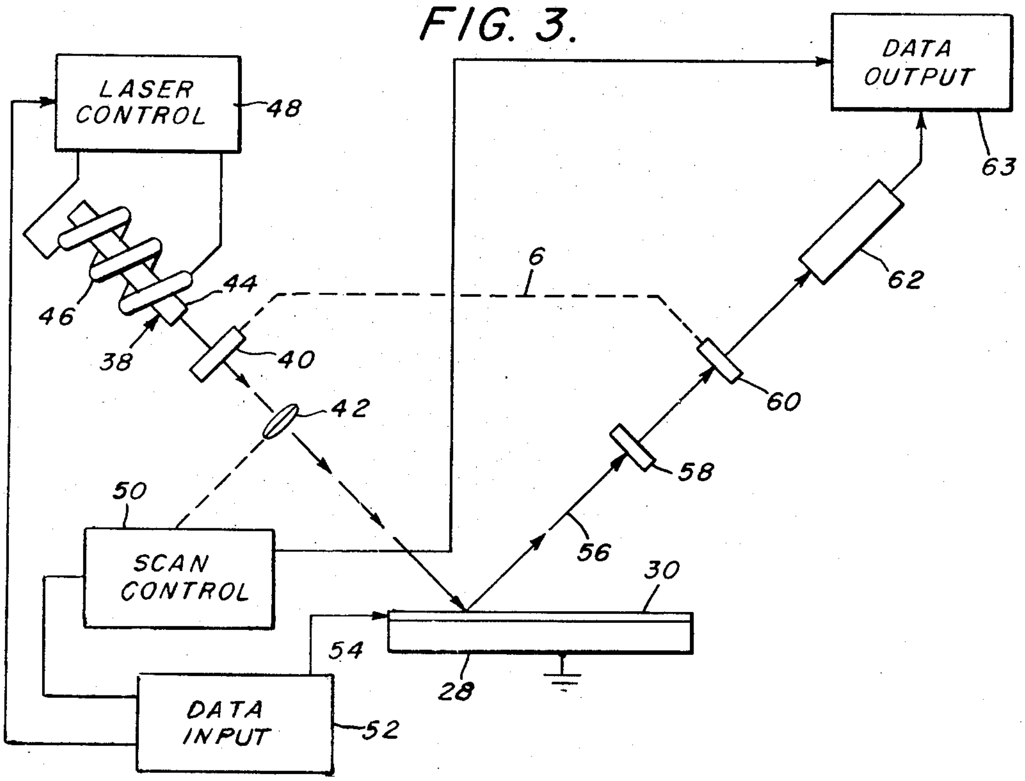
FIG. 3 illustrates one manner in which an array of memory devices, such as those shown in FIG. 1, can be scanned by a beam of polarized light.
Figures 4, 5:
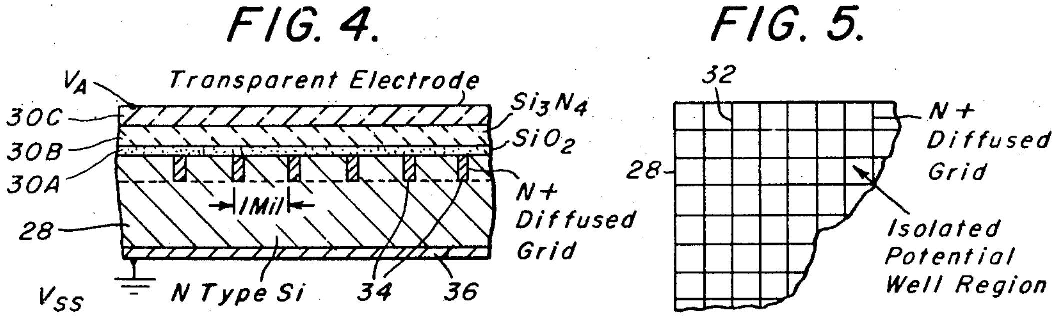
FIGS. 4 and 5 are cross-sectional and top views, respectively, of an array of memory devices showing the manner in which adjacent deep potential wells are separated one from the other by diffused strips forming a grid.

One specific arrangement for reading information into and out of an array of devices such as that shown in FIGS. 1 and 2 is illustrated in FIGS. 3–5. It includes a wafer 28 having layers of silicon dioxide, silicon nitride and a transparent conducting layer deposited on its upper surface, the three layers being indicated generally by the reference numeral 30 in FIG. 2 but being represented as 30A, 30B and 30C, respectively, in FIG. 4. Diffused into the upper surface of the wafer 28, as best shown in FIGS. 4 and 5, is a grid 32 comprising strips or bars of N+ diffused regions 34 (FIG. 4) which divide the upper surface of the wafer 28 into essentially square regions, each having a width of about 1 mil. This permits $10^6$ memory elements to be produced on each square inch of the wafer 28. On the bottom of the wafer 28 is a layer 36 of metal comprising a ground electrode.

With specific reference to FIG. 3, light from a laser 38 is directed through a polarizer 40 and through a scanning lens system, schematically illustrated at 42, onto the surface of the transparent electrode 30C. The laser 38 may take various forms; however, in the embodiment shown it comprises a rod 44 of paramagnetic material surrounded by a flashtube 46. The flashtube 46, in turn, is connected to a laser control circuit 48 such that energization of the laser can be controlled. The scanning optical system 42 likewise is connected to a scan control circuit 50 such that the location of the beam on the surface of the transparent electrode 30C can be controlled. The laser control 48 and the scan control 50 are connected to a data input system 52 which controls: (1) the position of the polarized beam on the surface of the transparent electrode 30C, (2) whether or not the laser is energized, and (3) the potential applied to the transparent electrode 30C. This latter potential is applied from the data input system 52 by a lead 54 in the schematic illustration of FIG. 3.

Polarized light reflected from the surface of the transparent electrode 30C along the path 56 is elliptically polarized. Consequently, it is passed through a quarterwave plate 58 which converts it back into plane polarized light. This plane polarized light, in turn, is passed through a second polarizer or analyzer 60 to a light sensing device, such as a photocell 62. The polarizers 40 and 60 are mechanically interconnected as shown by the broken line 64 to make certain that the polarizer 60 will be in the proper plane to pass light from polarizer 40. In theory, it is not necessary to utilize polarized light; however, it is preferred in most cases since it does not require that the wafer 28 be scanned in a dark environment.

In the operation of the invention, a positive potential will initially be applied by the input data system to the transparent electrode 30C via lead 54. This "clears" the memory unit and establishes the condition shown in FIG. 1 wherein the stored charge at all of the nitride-oxide interfaces within the areas bounded by the grid 32 is a net negative charge comprised of electrons and holes. The system is now ready for write-in. In order to write-in information, the scan control 50 causes the optical scanning system 42 to pass the polarized beam over each of the areas bounded by the grid 32 in a manner somewhat similar to a conventional scanning arrangement used in television systems. As the beam from the laser scans over each area bounded by the grid 32, input data system 52 either energizes the laser 38 through control 48 or deenergizes it, depending upon whether the bit to be stored in a particular area is a "-zero" or a "one." During a write-in cycle, the data input system 63 is disabled.

After the surface of the wafer 30 is scanned in the manner described above to write-in information into the various areas bounded by the grid 32, the same information can be read-out by again scanning the surface of the wafer in the manner described above. This is due to the fact that, as was explained above, the amplitude and phase of the light reflected from the surface of the transparent electrode 30C will vary depending upon whether the stored charge at the nitride-oxide interface is negative or positive. Negative charges, as explained above, constitute a "Zero;" whereas positive charges indicate a "one" in binary notation. Thus, as the entire surface of the wafer 30 is scanned, the amplitude and phase of the reflected beam 56 will vary, assuming that both "ones" and "zeros" are stored. The amplitude and phase of the reflected beam is correlated with the position of the beam in the output data system 63 to "read-out" the bits of information stored in the device. The information stored in the device can again be read-out or, if it is desired to erase this information, this is achieved by application of a positive pulse to the transparent electrode 30C via lead 54.

With reference now to FIG. 6, another embodiment of the invention is shown wherein elements corresponding to those shown in FIGS. 1 and 2 are identified by like reference numerals. In this case, however, isolation of adjacent deep potential well regions is achieved by means of a grid comprising thick oxide regions 66 formed above the silicon dioxide layer 12. This has the effect of insulating the electrode 16 from the substrate 10, such that the potential well regions are formed only within the boundaries formed by the oxide layer 66.

In FIG. 7, still another embodiment of the invention is shown, wherein somewhat the same result is achieved by providing a grid 68 from polycrystalline silicon or aluminum which forms an array of squares similar to that shown in FIG. 5. In this case, the grid 68 is at zero voltage or biased positive to again isolate one deep potential well region from an adjacent one with the same overall effect.

It will be appreciated that instead of providing a transparent electrode, such as electrode 30C, it is also possible to provide an opaque electrode and scan at the side of the wafer 28 opposite the silicon dioxide and silicon nitride layers.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A semiconductor memory device in which write-in and read-out of information is by way of optical techniques, comprising a substrate of semiconductive material, a layer of silicon dioxide formed on a surface of said substrate, a layer of silicon nitride formed on said silicon dioxide layer, an electrode deposited on top of said silicon nitride layer, means for directing a beam of light onto said oxide layers while establishing a potential between said electrode and said substrate to form a stored charge pattern at the interface between said silicon nitride and silicon dioxide layers, and means for thereafter directing a light beam toward said oxide layers and for measuring a characteristic of light reflected therefrom to determine whether a stored charge of a specific polarity exists at said interface.

2. The device of claim 1 wherein said light beam directed into said oxide layers comprises a hologram image.

3. The device of claim 1 wherein said electrode is transparent and said light beams are directed through said transparent electrode onto said oxide layers.

4. The device of claim 3 wherein said transparent electrode is formed from a material selected from the group consisting of tin oxide and indium oxide.

5. The device of claim 1 wherein said light beams are polarized, and including a source of unpolarized light, a polarizer for directing a beam of polarized light onto said oxide layers, a polarizer in the beam of light reflected from said oxide layers, and means for sensing a characteristic of light passing through said latter-mentioned polarizer.

6. The device of claim 5 wherein the characteristic of light sensed is its amplitude.

7. The device of claim 5 wherein the characteristic of light sensed is the phase of reflected polarized light.

8. The device of claim 1 wherein said substrate is divided into a plurality of deep potential well regions, and optical means for causing said light beams to scan over said deep potential well regions.

9. The device of claim 8 wherein said deep potential well regions are bounded by a grid formed by diffusion of an impurity into the surface of said wafer.

10. The device of claim 9 wherein said substrate is of N-type conductivity semiconductor material and said diffused grid is also of N-type conductivity but of higher impurity level than the main body of said substrate.

* * * * *